Sept. 22, 1964      D. E. CHUBB ETAL      3,150,277
HERMETIC MOTOR COOLING BY LIQUID REFRIGERANT Filed March 14, 1962      2 Sheets-Sheet 2

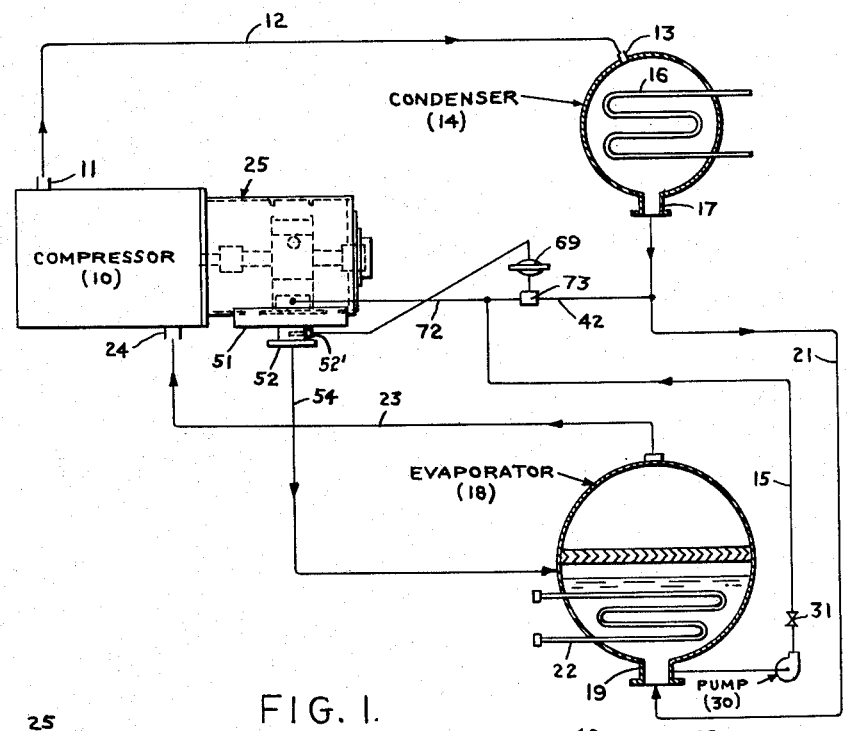

DONALD E. CHUBB
BERND S. GIVON
INVENTORS

United States Patent Office

3,150,277
HERMETIC MOTOR COOLING BY LIQUID REFRIGERANT

Donald Edward Chubb, Caldwell, and Bernd S. Givon, East Orange, N.J., assignors to Worthington Corporation, Harrison, N.J., a corporation of Delaware
Filed Mar. 14, 1962, Ser. No. 179,723
5 Claims. (Cl. 310—54)

This invention relates to refrigerating apparatus and particularly to such an apparatus using a motor driven compressor in which the motor is hermetically sealed and cooled.

Several methods of cooling hermetic motors have been suggested by the prior art. These methods generally employ a means by which a vaporized refrigerant is introduced to the hermetic unit for the purpose of cooling the normally heated motor parts. Cooling of a hermetic motor is deemed to be quite essential and important from an economic point of view since the amount of heat generated by a motor under normal operating conditions is a factor in determining the size of a motor and also its power output.

Liquid cooling of hermetic motors is generally limited since the coolant medium must be compatible for close association with the motor parts such as windings and insulation, etc. Also the presence of a liquid within the hermetic container tends to impair the efficiency of the motor because of the added frictional resistance set up between the moving parts.

It is therefore a primary object of the present invention to provide a hermetic motor which incorporates a highly efficient cooling system.

A further object is to provide such a motor which is cooled to a very high degree by substantially immersing the stator in a liquid refrigerant.

A still further object of the invention is to provide a refrigeration system in which the latent heat of evaporation of vaporizable refrigerant is employed to absorb the heat from the hermetic motor.

Another object is to provide a multi-component hermetic motor having means for separately accommodating liquid and vaporized refrigerant for cooling purposes.

Yet another object is to provide a refrigeration system having a hermetic prime mover, which system employs a refrigerating medium as the coolant for the prime mover.

In the drawings:

FIGURE 1 is a schematic representation of a refrigeration system including the present invention.

FIGURE 2 is a cross-sectional elevation view of an electric motor having a liquid and vaporant cooling means.

FIGURE 3 is a view in cross-section taken along line 3—3 of FIGURE 2.

Figure 4:
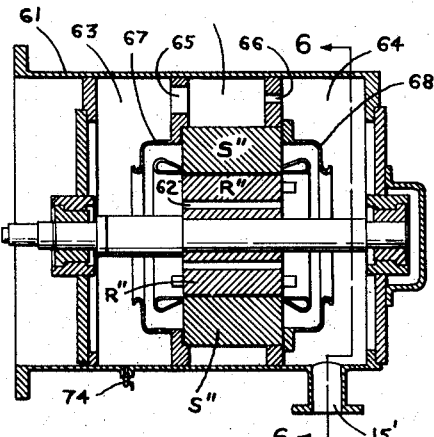
FIGURE 4 is a view in cross-section of an electric motor illustrating an alternate embodiment of the invention.

In brief, what is contemplated by the present invention is a novel refrigerating system employing a vaporizable refrigerant such as Freon or even a non-refrigerant vaporizable liquid common to the art. The system includes essentially a driven compressor, an electric motor for driving said compressor, a condenser, and an evaporator, which elements are connected to form a closed refrigeration cycle. The motor is hermetically sealed and provided with a means for circulating liquid and vaporized refrigerant about the moving parts thereof.

In one embodiment of the invention a motor enclosure includes an elongated metallic casing having sealed end panels in which the rotor shaft bearings are supported. A pair of plates spaced inwardly of the respective end panels and fitting closely against the stator define opposed end chambers in the enclosure separated by an annular jacket formed between the casing inner wall and the stator outer wall. Said annular jacket is adapted for receiving and holding a supply of liquefied refrigerant at system low pressure in sufficient quantity to substantially immerse the stator. Apertures, or similar communicating means formed into the respective plates at a point above the refrigerant level, permit vaporous refrigerant to pass from the jacket into the enclosed end chambers, and thence to be circulated about the moving and stationary motor parts. An opening in the casing lower surface conducts said vapor from the annular chamber for recirculation in the refrigeration system. Suitable means associated with the said jacket permits maintenance of a desired level of liquid therein.

Referring to the drawings, a refrigeration system of the type presently contemplated is shown in FIGURE 1 and includes, a motor driven compressor 10 having its outlet 11 connected by a conduit 12 to inlet 13 of the condenser 14. This condenser may be one of the normal commercial types such as the shell and tube type in which cooling water is forced through a coil 16 disposed to contact vaporous refrigerant and condense the same. Refrigerant liquid from the condenser 14 then accumulates in a hot well or accumulator 17. This element in accordance with present practice is provided with a float chamber or other control means for regulating the flow of refrigerant to the evaporator 18. This chamber may, for example, be the type which employs a float valve arrangement for metering liquid refrigerant from the said chamber through conduit 21 into the inlet 19 of the evaporator unit 18.

The evaporator 18 receives condensed liquid through conduit 21, said evaporator may also be of the shell and tube type in which the fluid is passed through tube 22, contacts incoming liquid refrigerant to cause the same to boil. This refrigerant gas then completes the refrigeration cycle by flowing through conduit 23 to the compressor suction 24 to be compressed and returned into the condenser 14. A branch conduit 15 directly connects the evaporator 18 liquid portion with the motor through pump 30, valve 31 and line 72.

Referring to FIGURE 2, the hermetic motor 25 comprises basically a stator S which is positioned by suitable holding means such as a frame or rings 27 and 28, which supportedly engage a fluid tight casing 29.

The ends of the casing 29 are closed by cover plates 32 and 33 which may be tightly fixed to the casing by gasketing or similar seals for the purpose of establishing a hermetic condition therein. The motor rotor R consists primarily of a shaft 35 having electrical elements attached thereon and having bearings 37 and 38 at each end thereof supported in the casing for rotation within the stator S.

The rotor R may also be provided as is customary in the art, with fluid propelling vanes 39 and 40 disposed thereabout for circulating coolant vapors to induce their flow through the motor.

As shown in FIGURE 2, bearing 38 may be disposed completely within the casing enclosure defined by the casing 29, while the bearing 37 is fastened to the end plate 32 by suitable seal means to maintain the hermetic condition within the casing enclosure. One end of the shaft extends beyond the end plate and is normally coupled by connecting means to the compressor 10 or other mechanism to be actuated.

In accordance with the present invention and referring to FIGURE 2, the casing 29 defines an elongated hermetic closure. Panels 27 and 28 are disposed in supporting relation to the stator S lateral surfaces and are of such a diameter to fit closely within the casing. The center panels 27 and 28 are affixed to the stator S outer wall by welding or by suitable sealing means to provide a fluid tight seam between the stator wall in each of said center panels. This chamber is provided with means for conducting the liquid refrigerant thereto. Suitable to the purpose may be a fitting 41 as shown in FIGURE 3, adapted to receive piping or tubing which transverses the wall of the casing 29 and communicates with said chamber 43.

As shown in the drawings, the motor stator and casing may be disposed in substantial eccentric relationship to define the chamber for holding the vaporizable liquid. When so disposed, the chamber upper, or vapor holding, portion is substantially longer than if a concentric arrangement were employed, thereby assuring more constant stream of vapor.

Figure 5:
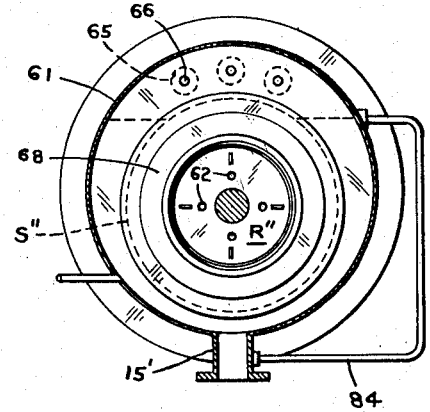
FIGURE 5 is a view in cross-section taken along line 6—6 of FIGURE 4.

As shown in FIGURES 1 and 3, inlet 41 is positioned preferably such that liquid refrigerant may flow into the chamber 43 and rise to the level indicated, thereby substantially immersing the major part of the stator S. The actual level of the liquid retained in this annular chamber is determined and maintained by an overflow arrangement which, as shown in FIGURE 5, provides a passage from the liquid holding chamber of the casing to conduit 15.

As the chamber 43 becomes filled or at least partially filled with liquid refrigerant, heat generated under normal operating conditions within the stator S will flow outwardly and be absorbed by the liquid.

The vaporized refrigerant then flows outwardly through openings 48, 49 to the respective end chambers 46 and 47 which surround the center annular chamber 43. To insure proper cooling, the shaft 35 or rotor R may be provided as previously mentioned with vanes 39 and 40 or a fan arrangement for circulating the vaporized refrigerant over and through the respective end coils 36.

While openings 48 and 49 are preferably located as shown, above the refrigerant level, such a requirement does not limit the intended scope of the invention. For example, plates 27 and 28 may be provided with means such as porous, vapor conducting plugs or filters which will block the liquid flow therethrough. Further, said plates may be fabricated of a material having the property of holding liquid while passing vapors therethrough.

In the manner described, refrigerant vapors will contact both the heated elements of the motor itself, and the surrounding casing walls. Warmed vaporous refrigerant will then gravitate toward the lower portion of end chambers 46 and 47 which are provided with a manifold 51 having outlet means 52 connected to a return line 54 for conducting the warmed vaporized refrigerant and any liquid refrigerant back into the system for recirculation.

Referring to FIGURE 4, a further arrangement is shown illustrating an alternate embodiment of the invention. In this arrangement hermetic casing 61 defines an enclosure about the motor consisting of rotor R" and stator S". The journaled rotor R" is modified by provision of a series of passages 62 which extend substantially parallel to the shaft and in effect communicate the respective end chambers 63 and 64 formed within the hermetic casing. These passages or longitudinal openings are for the purpose of conducting refrigerant from one end chamber to the other thus bringing refrigerant into heat exchange contact with heated rotor parts. An overflow conduit 84 maintains liquid at a desired level.

The actual arrangement of the stator S" and the rotor R" within the casing 61 will be similar to that as previously mentioned in the description of FIGURE 2. In order to provide the desired flow pattern through the rotor R" though, the upper portion of the liquid holding jacket 71 is provided with openings 65 which lead into the end chamber 63. Since refrigerant entering the end chamber 64 through passages 62 will be substantially warmed due to contact with the hot rotor parts, supplementary cooling to this latter chamber may be necessary.

This is provided by communicating said chamber 64 with the liquid holding chamber as shown in the drawing, through a series of constricted openings 66 having the purpose of metering vapor into the end chamber 63. When the latter arrangement is employed, the rotor may be provided with vanes or suitable deflecting means which will urge the refrigerant vapors outwardly or upwardly as required for optimum contact with the stator coils and other parts of the motor.

An additional means for deflecting refrigerant vapor entering the motor end chambers is shown in FIGURE 4. This means comprises baffles 67, 68, or a ring-like segment fastened in position to prevent direct impingement of liquid refrigerant on such motor parts as insulated coils and wires. The baffles are shaped with a peripheral lip which accumulates liquefied vapor and conducts the same toward the casing liquid outlets.

Provision of this deflection means minimizes the otherwise detrimental effect of the refrigerant entering through the openings 65 and 66 which may under certain conditions cause erosion of the said motor parts, especially varnish insulated windings.

When the arrangement of the motor as shown in FIGURE 4 is employed, the means for removing coolant refrigerant from the casing is similar to that previously described and consists of a vapor conducting opening 15' formed in the lower portion of the chamber 64. Since a portion of the vaporous refrigerant may condense in chamber 63, this chamber is provided with a drain 74 for removing accumulated liquid settled in the bottom thereof.

While we have herein described the invention as being used specifically in conjunction with a refrigeration system, it will be readily seen that hermetically sealed motors of the type described may be used in other types of installations. For example, a hermetic motor embodying the present teaching may be readily used as a prime mover for heavy equipment, particularly where the motor is enclosed and otherwise difficult to cool. However, for the present purpose of adequately describing the operation of this system, the following will assume a hermetic motor is employed as the compressor driving means in a normal refrigerating system.

Reference is again made to FIGURE 1 illustrating a typical refrigeration system. As herein described, in one phase of this system liquid refrigerant is passed from hot well 17 of the condenser 14, through conduit 21, to the low pressure or evaporator portion of the system. The atmosphere within the hot well 17 is generally at a slightly elevated pressure. In the event that insufficient liquid is available from the condenser at start-up, or at low system loads, an auxiliary pump 30 will automatically start and provide liquid for motor cooling from the evaporator 18.

The pressure in this portion of the system is normally sufficient to force liquid refrigerant into the liquid containing chamber of the hermetic motor. Therefore, the motor may be positioned physically either above or below the source of liquid refrigerant and is not restricted as to physical disposition. When, however, the position of the motor is such that the force of gravity will prevent a ready flow to the liquid holding portion, pumping means may be employed to maintain a satisfactory level of the liquid in the liquid containing chamber in accordance with the rate at which said liquid evaporates.

To maintain the proper liquid level, the previously mentioned sensing means 45 is positioned within the liquid chamber and may be connected to control valve 73 or to pump 30 for assuring passage of sufficient liquid into the liquid chamber. It is understood that maintenance of the required liquid level may be achieved by means well known in the art and those above mentioned are merely illustrative.

Alternate means for supplying liquid holding chamber 43 is provided to assure a continuous flow of liquid to the motor at all times. For example, at initial start-up virtually all refrigerant in the system will be in the evaporator. Thus, pump 30 is actuated temporarily, only at start-up, to feed liquid through valve 31 and line 15 to the motor. With the system in full operation, pumped refrigerant is no longer required since condensate from accumulator 17 carried through lines 42 and valve 73 will suffice.

Conduit means connected to manifold 51 directs liquid and vapor refrigerant to the evaporator 18 for recycling through the system. As a further means of controlling or metering the flow of liquid into the hermetic motor, a thermostatic device may be employed in the header 51 for continuously determining the temperature of the liquid egressing from the motor. Thus, under normal operating conditions, liquid flow to chamber 43 will be entirely through a valve means 73 having a thermal element 52' positioned to monitor temperature of refrigerant leaving the motor casing.

As may be readily appreciated by those skilled in the art, the herein described motor cooling means provides many advantages both economical and practical. Primarily though it has been found that by use of the disclosed motor cooling, for any particular installation the size of the motor may be decreased appreciably as contrasted with a motor employing air cooling or one of the heretofore known methods of cooling.

Figure 6:
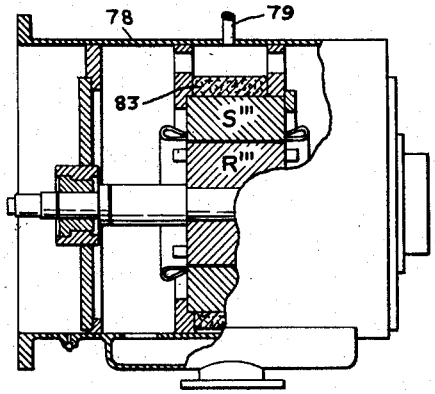
FIGURE 6 is a cross-sectional view of still another means for cooling a motor interior.

Alternate means for direct cooling of the motor stator is illustrated in FIGURE 6 of the drawings. The stator S''' and rotor R''' are enclosed within a casing 78. A plurality of injectors 79 is disposed about the stator immediately adjacent the stator surface for delivering atomized refrigerant thereto.

Indirect contact between liquid refrigerant and the stator S''' is also accomplished as shown by the arrangement in FIGURE 6. This is achieved by providing the stator surface with a liquid retentive body. The stator S''' is blanketed with a peripheral layer 83 of capillaceous material holding liquid refrigerant. The latter may consist of a thickness of woven or packed metallic fibers, or even a filter member defined by fibers of a heat-resistant non-metal, such as asbestos or Teflon, the latter having a tetrafluoroethylene rosin made by the DuPont Company. The blanket is wrapped tightly against the stator surface and is provided with means for introducing liquid thereto in sufficient amount to maintain a desired temperature in the motor elements.

As shown, the liquid-introducing means may constitute merely a conduit directing a stream of refrigerant into the upper surface of the blanket. Alternately, manifolding means may surround the blanket for delivering a plurality of streams against the layer to provide a more uniform wetting. In either event, the refrigerant liquid is contained within the blanket primarily by capillary action of the woven fibers, thus permitting only vaporous refrigerant to leave for circulation in the motor casing.

It is to be understood that certain variations and changes may be employed to modify the basic teaching of the present novel refrigeration system and hermetic motor cooling method. These modifications, however, are readily made by one skilled in the art without departing from the spirit or scope of the present invention.

What is claimed is:

1. A hermetically sealed and cooled motor in a refrigeration system carrying a vaporizable refrigerant, said motor including; a stator, a rotor journalled for rotating in the stator, means in the rotor forming axially extending passages therethrough, and a casing surrounding the rotor and stator and defining a hermetic enclosure;
    (a) a pair of longitudinally spaced panels carried peripherally on the stator and defining a liquid holding chamber intermediate the respective casing, stator and spaced panels, and forming opposed end chambers in the casing separated by said liquid holding chamber,
    (b) means forming an inlet to said liquid holding chamber and being communicated with a source of liquid refrigerant in said system,
    (c) overflow conduit means communicated with said liquid holding chamber and having an opening disposed in the upper portion of said chamber to maintain a predetermined level of liquid refrigerant therein, said overflow conduit means being communicated with said system for returning refrigerant thereto,
    (d) passage means communicated the upper portion of said liquid holding chamber above the level of liquid therein with at least one of said opposed end chambers in the casing for directing refrigerant in vapor phase to said at least one end chamber, and
    (e) conduit means being communicated with the lower portion of said respective opposed end chambers and conducting refrigerant therefrom to the system.

2. In a hermetically sealed and cooled motor as defined in claim 1 wherein; said passage means connecting the upper portion of said liquid holding chamber above the level of liquid therein includes:
    (a) means forming an aperture in one of said pair of panels for introducing vaporous refrigerant to an end chamber adjacent said one panel.

3. In a hermetically sealed and cooled motor as defined in claim 1 wherein; said passage means communicating the upper portion of said liquid holding chamber above the level of liquid therein includes;
    (a) means forming apertures in each of said pair of spaced panels,
    (b) apertures in one of said panels being substantially greater in cross sectional area than aperture in said other panel, whereby one of said opposed end chambers will receive a flow of vaporous refrigerant from said liquid holding chamber greater than the vaporous flow of said other end chamber.

4. In a hermetically sealed and cooled motor as defined in claim 1 including:
    (a) means disposed in said liquid holding chamber forming a liquid retentive barrier of closely packed and intermeshed fibers at said passage means communicating with the upper portion of said liquid holding chamber, to permit flow of vapor only to said opposed end chambers.

5. In a hermetically sealed and cooled motor as defined in claim 4 wherein;
    (a) said means disposed in said liquid holding chamber forming a liquid impervious barrier at said passage means communicating with the upper portion of said liquid holding chamber comprising an annular body forming a layer of closely packed fibers of a non-porous material.

References Cited in the file of this patent

UNITED STATES PATENTS

| | | |
|---|---|---|
| Re. 24,802 | Kocher | Mar. 29, 1960 |
| 2,184,285 | Codling | Dec. 26, 1936 |
| 2,746,269 | Moody | May 22, 1956 |
| 2,768,511 | Moody | Oct. 30, 1956 |
| 2,793,506 | Moody | May 28, 1957 |
| 2,891,391 | Kocher | June 23, 1959 |
| 2,963,878 | Beggs | Dec. 13, 1960 |
| 2,967,410 | Schulze | Jan. 10, 1961 |
| 2,986,905 | Kocher | June 6, 1961 |